United States Patent
Nishijima

(10) Patent No.: US 10,102,628 B2
(45) Date of Patent: Oct. 16, 2018

(54) OBJECT RECOGNIZING APPARATUS AND HAZE DETERMINATION METHOD

(71) Applicant: TOYOTA JIDOSHA KABUSHIKI KAISHA, Toyota-shi, Aichi-ken (JP)

(72) Inventor: Masakazu Nishijima, Ebina (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 54 days.

(21) Appl. No.: 15/241,685

(22) Filed: Aug. 19, 2016

(65) Prior Publication Data

US 2017/0098298 A1 Apr. 6, 2017

(30) Foreign Application Priority Data

Oct. 2, 2015 (JP) .................. 2015-196817

(51) Int. Cl.
 *G06K 9/00* (2006.01)
 *G06T 7/00* (2017.01)
 *H04N 13/204* (2018.01)
 *G06K 9/46* (2006.01)
 *H04N 13/02* (2006.01)
 *H04N 13/00* (2018.01)

(52) U.S. Cl.
 CPC .......... *G06T 7/004* (2013.01); *G06K 9/00805* (2013.01); *G06K 9/4604* (2013.01); *H04N 13/0239* (2013.01); *H04N 13/204* (2018.05); *G06T 2207/30252* (2013.01); *H04N 2013/0081* (2013.01)

(58) Field of Classification Search
 CPC .............. G06K 9/00805; G06K 9/4604; G06T 2207/30252; G06T 7/004; H04N 13/0203; H04N 13/0239; H04N 2013/0081
 See application file for complete search history.

(56) References Cited

U.S. PATENT DOCUMENTS

| | | |
|---|---|---|
| 2012/0133739 A1 | 5/2012 | Morimitsu |
| 2013/0259309 A1 | 10/2013 | Sekiguchi |
| 2014/0029790 A1* | 1/2014 | Gallen .............. G01N 21/538 382/103 |
| 2015/0092989 A1 | 4/2015 | Kasaoki |

FOREIGN PATENT DOCUMENTS

| | | |
|---|---|---|
| JP | 2012-118698 A | 6/2012 |
| JP | 2013-203337 A | 10/2012 |
| JP | 2013-206328 A | 10/2013 |
| JP | 2015-69381 A | 4/2015 |

* cited by examiner

*Primary Examiner* — Nirav G Patel

(74) *Attorney, Agent, or Firm* — Sughrue Mion, PLLC

(57) ABSTRACT

An object recognizing apparatus is provided with: an acquirer configured to acquire a plurality of images photographed by a stereo camera; a segment extractor configured to calculate parallax from the plurality of images and to extract a set in which the parallax is within a predetermined range, as a segment, at intervals of a certain width in an image lateral direction; a target extractor configured to extract segments coupled in the image lateral direction and an image depth direction, as a target; a calculator configured to calculate a variation amount of upper end positions and a variation amount of height widths of the segments that constitute the target; and a determinator configured to determine that the target is a haze if at least one of the variation amount of the upper end positions and the variation amount of the height widths is greater than a predetermined threshold value.

4 Claims, 8 Drawing Sheets

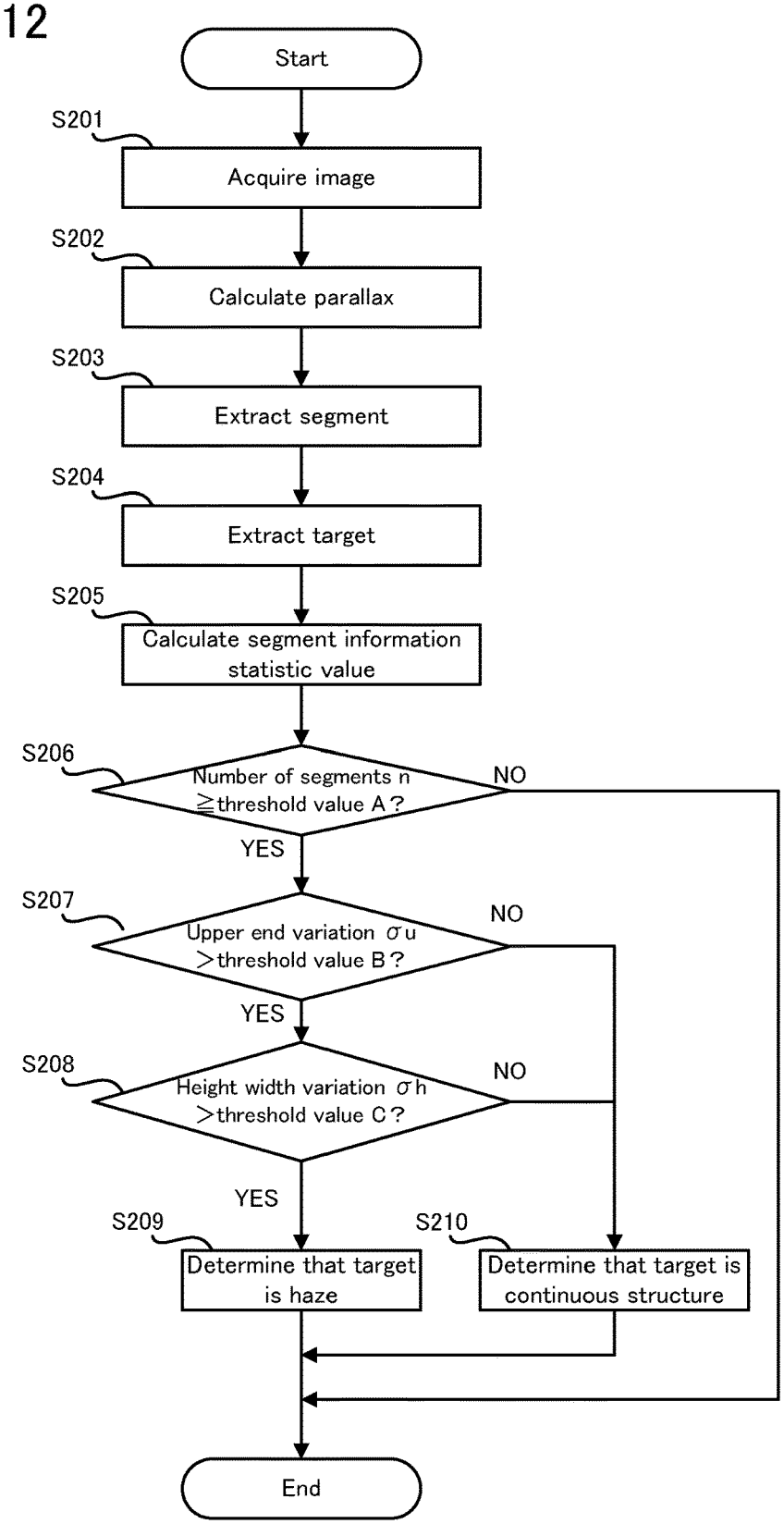

OBJECT RECOGNIZING APPARATUS AND HAZE DETERMINATION METHOD

CROSS-REFERENCE TO RELATED APPLICATIONS

This application is based upon and claims the benefit of priority of the prior Japanese Patent Application No. 2015-196817, filed on Oct. 2, 2015, the entire contents of which are incorporated herein by reference.

BACKGROUND OF THE INVENTION

1. Field of the Invention

Embodiments of the present invention relate to an object recognizing apparatus and a haze determination method, which use photographed images of a stereo camera mounted on a vehicle, such as, for example, an automobile.

2. Description of the Related Art

For this type of apparatus, there is known an apparatus configured to recognize a haze, a mist, a fog, or the like in photographed images by performing various processing on the photographed images. For example, in Patent Literature 1, there is proposed an apparatus configured to determine that among objects detected by processing the photographed images, an object with a large variation of parallax is the haze. In Patent Literatures 2 and 3, there is proposed an apparatus configured to determine that an object is the haze if the object has low image edge strength. In Patent Literature 4, there is proposed an apparatus configured to determine that an object or an area obtained by dividing the object with a large size change on a time series is the haze.

CITATION LIST

Patent Literature

Patent Literature 1: Japanese Patent Application Laid Open No. 2013-203337
Patent Literature 2: Japanese Patent Application Laid Open No. 2012-118698
Patent Literature 3: Japanese Patent Application Laid Open No. 2015-069381
Patent Literature 4: Japanese Patent Application Laid Open No. 2013-206328

In semi global matching (SGM), which is one of stereo parallax calculating methods, the parallax can be calculated even in a pixel or area with a less image edge (in other words, with low pixel edge strength) by referring to the parallax in the surroundings of the pixel or area. Therefore, the SGM allows the calculation of the parallax in a wall or guardrail with low surface irregularities, or the like, which cannot be calculated in existing edge-base technologies.

However, the object with low image edge strength detected by the stereo parallax calculating methods, such as the SGM, is possibly erroneously determined to be the haze in the technologies in the Patent Literatures 2 and 3. Moreover, in the SGM, the parallax tends to vary greatly because the parallax is obtained by referring to the parallax in the surroundings in an area with low image edge strength. Thus, the object is possibly erroneously determined to be the haze even in the technology disclosed in the Patent Literature 1. As described above, if the SGM, which is one of the stereo parallax calculating methods, is used to recognize an object, it is hard to accurately determine whether or not the object with low image edge strength is the haze, which is technically problematic.

On the other hand, in the technology as described in the Patent Literature 4, the determination requires a certain time because the size change on the time series is used, and moreover, a process required for the determination may become highly complicated, which is also technically problematic.

SUMMARY

In view of the aforementioned problems, it is therefore an object of embodiments of the present invention to provide an object recognizing apparatus and a haze determination method in which the presence of a haze, a mist, a fog, or the like in photographed images can be determined.

The above object of embodiments of the present invention can be achieved by an object recognizing apparatus comprising: an acquirer configured to acquire a plurality of images photographed by a stereo camera; a segment extractor configured to calculate parallax from the plurality of images and to extract a set in which the parallax is within a predetermined range, as a segment, at intervals of a certain width in an image lateral direction; a target extractor configured to extract segments coupled in the image lateral direction and an image depth direction, as a target; a calculator configured to calculate a variation amount of upper end positions and a variation amount of height widths of the segments that constitute the target; and a determinator configured to determine that the target is a haze if at least one of the variation amount of the upper end positions and the variation amount of the height widths is greater than a predetermined threshold value.

According to the object recognizing apparatus in embodiments of the present invention, the target is determined to be the haze if at least one of the variation amount of the upper end positions and the variation amount of the height widths of the segments that constitute the target is greater than the predetermined threshold value. It is thus possible to even determine whether or not the target with low image edge strength is the haze.

The above object of embodiments of the present invention can be achieved by A haze determination method comprising: acquiring a plurality of images photographed by a stereo camera; calculating parallax from the plurality of images and extracting a set in which the parallax is within a predetermined range, as a segment, at intervals of a certain width in an image lateral direction; extracting segments coupled in the image lateral direction and an image depth direction, as a target; calculating a variation amount of upper end positions and a variation amount of height widths of the segments that constitute the target; and determining that the target is a haze if at least one of the variation amount of the upper end positions and the variation amount of the height widths is greater than a predetermined threshold value.

According to the haze determination method in embodiments of the present invention, as in the object recognizing apparatus in embodiments of the present invention, it can be determined whether or not the target with low image edge strength is the haze.

The nature, utility, and further features of this invention will be more clearly apparent from the following detailed description with reference to preferred embodiments of the invention when read in conjunction with the accompanying drawings briefly described below.

BRIEF DESCRIPTION OF THE DRAWINGS

FIG. 12 is a flowchart illustrating a flow of a haze determination process according to a second embodiment.

DETAILED DESCRIPTION OF THE PREFERRED EMBODIMENTS

An object recognizing apparatus and a haze determination method according to embodiments of the present invention will be explained with reference to the drawings.

<First Embodiment>

An object recognizing apparatus and a haze determination method according to a first embodiment of the present invention will be explained.

(Configuration of Object Recognizing Apparatus)

Figure 1:
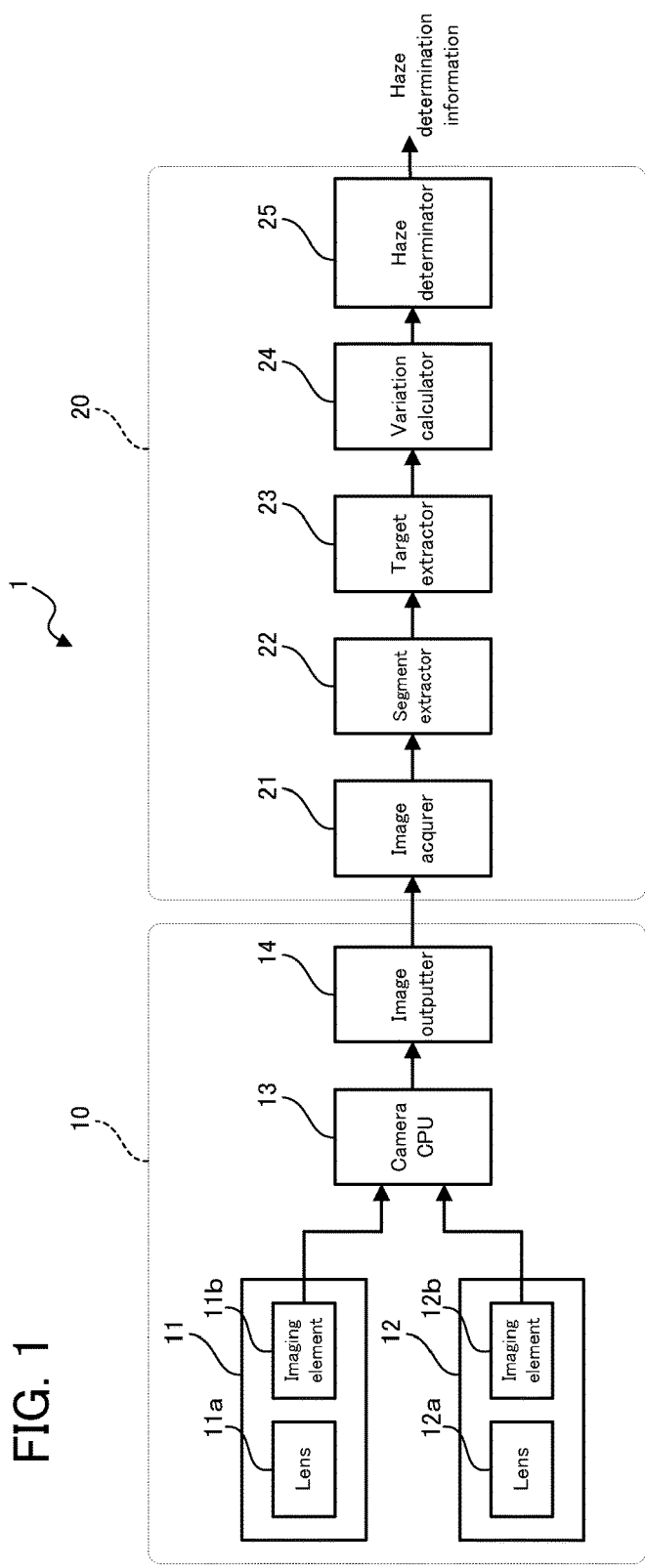
FIG. 1 is a block diagram illustrating a main part of an object recognizing apparatus according to a first embodiment.

Firstly, a configuration of the object recognizing apparatus according to the first embodiment will be explained with reference to FIG. 1. FIG. 1 is a block diagram illustrating a main part of the object recognizing apparatus according to the first embodiment.

In FIG. 1, an object recognizing apparatus 1 is mounted on a vehicle, such as an automobile, and is configured to recognize (in other words, detect) an object that exists around the vehicle. The object recognizing apparatus 1 is configured to perform the object recognition by using parallax between photographed images, as described later, but may also be configured to perform the object recognition by pattern matching as well. The object recognizing apparatus 1 is provided with a stereo camera 10 and a stereo image recognizing apparatus 20.

The stereo camera 10 is provided with: a left camera 11 having a lens 11a and an imaging element 11b; a right camera 12 having a lens 12a and an imaging element 12b; a camera central processing unit (CPU) 13; and an image outputter 14.

The imaging elements 11b and 12b may include a charge couple device (CCD) or the like. The camera CPU 13 is configured to control exposure of each of the left camera 11 and the right camera 12, or the like. Moreover, the camera CPU 13 is configured to transmit photographed images imaged by the imaging elements 11b and 12b, as image signals, to the stereo image recognizing apparatus 20 via the image outputter 14, which is an output interface.

Here, the left camera 11 and the right camera 12, which constitute the stereo camera 10, are arranged at positions where the left camera 11 and the right camera 12 can photograph an area in which an object is to be recognized by the object recognizing apparatus 1. For example, the stereo camera 10 is placed at a position where the stereo camera 10 can photograph an area ahead of the vehicle (i.e. an area corresponding to a visual field of a driver) through a windshield. If an object on sides of or behind the vehicle is to be recognized, the stereo camera 10 may be placed at a position where an area on the sides or behind the vehicle can be photographed. Moreover, the object recognition can be performed in a plurality of areas if a plurality of stereo cameras 10 are arranged.

The stereo image recognizing apparatus 20 is provided with an image acquirer 21, a segment extractor 22, a target extractor 23, a variation calculator 24, and a haze determinator 25. The image acquirer 21, the segment extractor 22, the target extractor 23, the variation calculator 24, and the haze determinator 25 are functions realized by that a not-illustrated CPU provided for the stereo image recognizing apparatus 20 executes a computer program stored in a not-illustrated read only memory (ROM). The image acquirer 21, the segment extractor 22, the target extractor 23, the variation calculator 24, and the haze determinator 25 are respectively one specific example of the "acquirer", the "segment extractor", the "target extractor", the "calculator", and the "determinator".

The stereo image recognizing apparatus 20 is configured to output a result of a haze determination process (i.e. whether or not the recognized object is a haze). The result of the haze determination process is used for a pre-crash safety system of the vehicle, or the like.

(Haze Determination Process)

Figure 2:
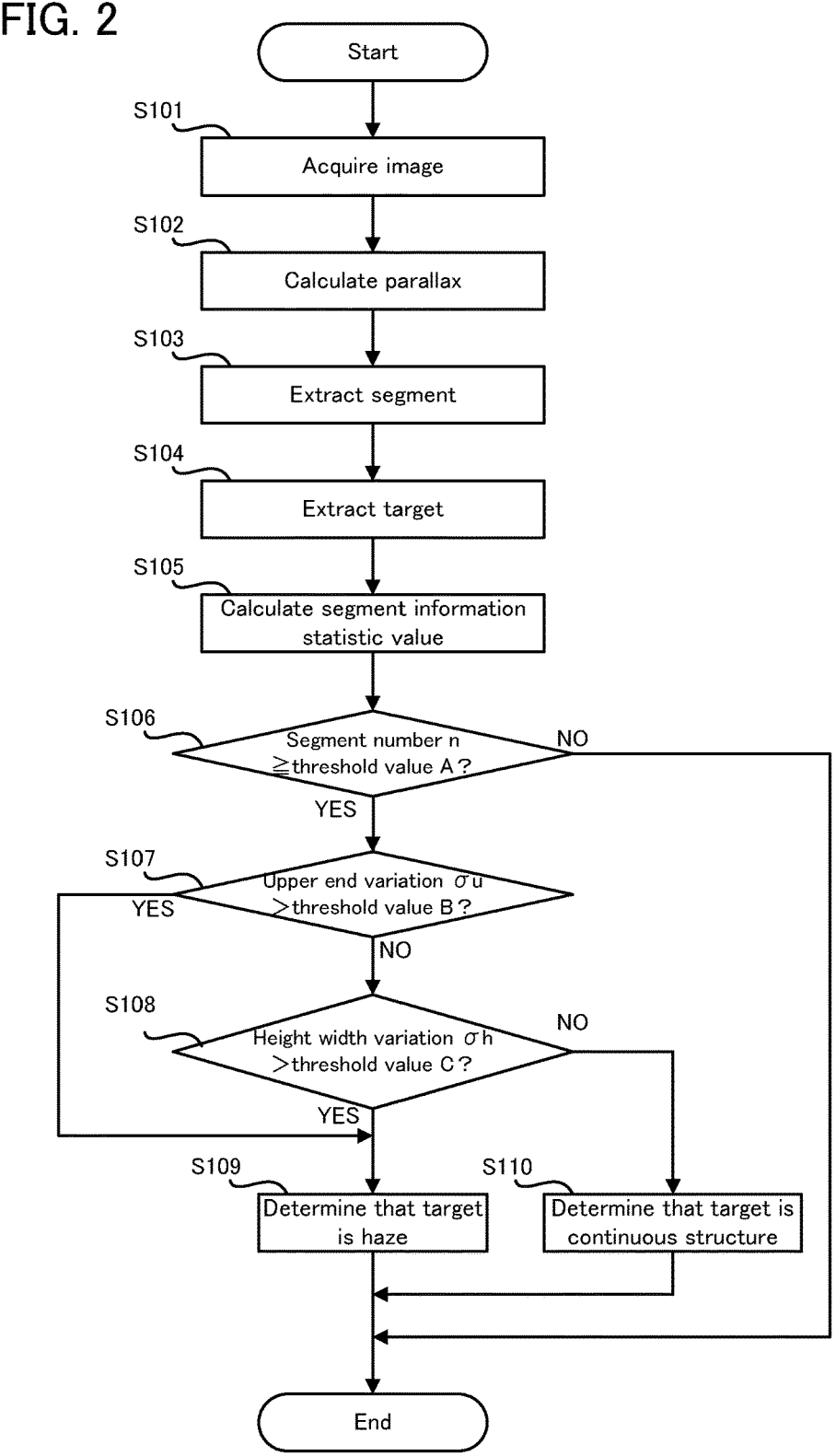
FIG. 2 is a flowchart illustrating a flow of a haze determination process according to the first embodiment.

Next, the haze determination process performed by the object recognizing apparatus 1 described above will be explained with reference to FIG. 2. FIG. 2 is a flowchart illustrating a flow of the haze determination process according to the first embodiment. A routine of the haze determination process illustrated in FIG. 2 is repeatedly performed every predetermined period while an ignition switch of the vehicle is on.

In FIG. 2, in the haze determination process performed by the object recognizing apparatus 1 according to the first embodiment, firstly, photographed images are acquired (step S101). Specifically, images photographed by the left camera 11 and the right camera 12 of the stereo camera 10 are inputted to the image acquirer 21 of the stereo image recognizing apparatus 20, as image data, via the camera CPU 13 and the image outputter 14. On the image acquirer 21, a pair of image data (i.e. image data of the right camera 11 and image data of the left camera 12) is acquired every predetermined period. The image acquirer 21 outputs the acquired pair of image data to the segment extractor 22.

On the segment extractor 22, parallax is calculated from the pair of image data (step S102). The parallax is calculated as a parallax value for each corresponding pixel or pixel block, from a correlation between the pair of image data. The parallax value is calculated as a shift amount between the pair of image data, and is a value that varies depending on a distance to an object in the photographed images. Specifically, if the distance to the object is close, the parallax value is calculated as a relatively large value. On the other hand, if the distance to the object is far, the parallax value is calculated as a relatively small value. For the calculation of the parallax value, the SGM, which is one of the stereo parallax calculating methods, may be used. In the subsequent process, one parallax image data (i.e. image data having parallax information) obtained from the pair of image data is used.

If the parallax is calculated, a segment S is further extracted on the segment extractor 22 (step S103). The segment S is a set of pixels or pixel blocks in which the parallax value is within a predetermined range, and is extracted at intervals of a certain width in an image lateral direction. The "predetermined range" herein is a range set in advance for determining whether or not the parallax is close enough to be considered as being substantially the same. Moreover, the "certain width" is a value set in advance as a width of the extracted segment, and is set on the basis of various conditions, such as the number of pixels of the photographed images and a size of an object to be detected.

For the extraction of the segment S, a long narrow box obtained by dividing the photographed image at intervals of the certain width in the lateral direction (or a virtual area corresponding to a segment extraction unit) is used. In the box, a parallax set which exists in an area corresponding to the box, in which the parallax value is within the predetermined range, and in which pixels have similar image lateral positions (i.e. a set of pixels having parallax information) is voted. The parallax set voted in each box has position information regarding a height direction of the image, and keeps the position information regarding the height direction after being voted. After the voting, each box is scanned in a longitudinal direction (i.e. the height direction), and the parallax sets coupled in the height direction in each box is extracted as the segment S.

According to the aforementioned voting process, among the pixels corresponding to each box, a plurality of (e.g. M) parallax sets in which the parallax value is within the predetermined range and which are coupled in the lateral direction are extracted, and among the extracted plurality of parallax sets, a plurality of (e.g. N) parallax sets which are also coupled in the longitudinal direction are extracted as the segment. A plurality of segments S may be extracted from one box. A segment extraction result by the segment extractor 22 is outputted to the target extractor 23.

On the target extractor 23, the segments S coupled in the image lateral direction and a depth direction (i.e. a distance direction) are extracted as a target Tg corresponding to the object in the photographed images (step S104). The "depth direction" herein is a direction defined by the calculated parallax. The image data itself has only information regarding the longitudinal direction and the lateral direction (i.e. two-dimensional data); however, the image data may newly acquire information regarding the depth direction by calculating the parallax. Hereinafter, with reference to FIG. 3 to FIG. 6, the target Tg to be extracted will be specifically explained.

Figure 3:
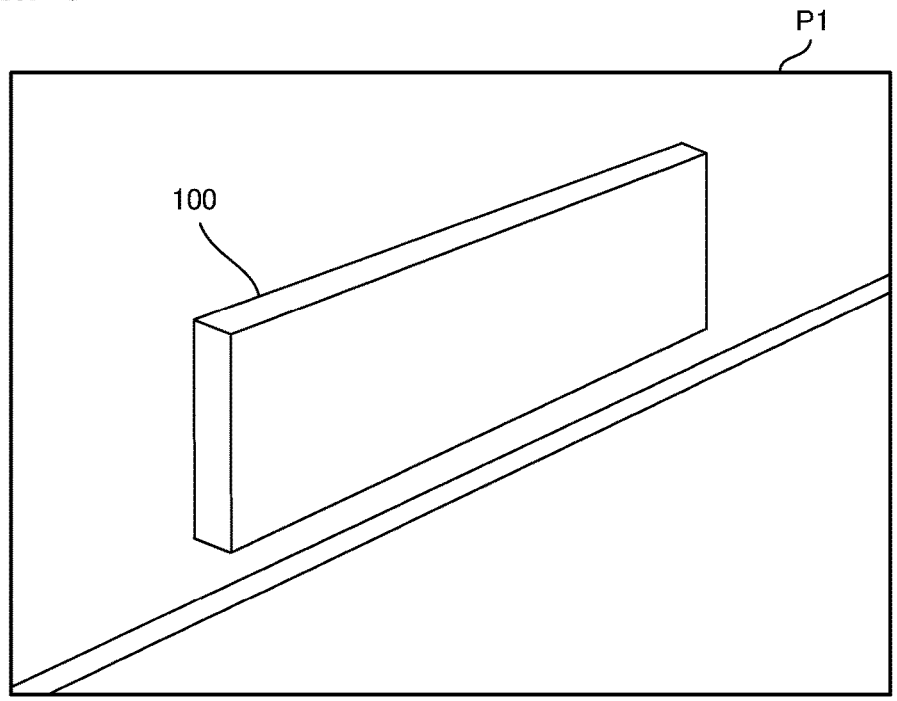
FIG. 3 is a diagram illustrating one example of a photographed image including a continuous structure.

FIG. 3 is a diagram illustrating one example of a photographed image including a continuous structure. A photographed image P1 includes a continuous structure 100 (e.g. a guardrail, a wall, etc.). The continuous structure 100 herein particularly has a characteristic feature that its surface has low irregularities and that image edge strength is low. The parallax of the continuous structure 100 as described above is hardly calculated in an edge-base parallax calculating method. By using the SGM, however, the parallax can be calculated by referring to the parallax in the surroundings even in an area with low image edge strength. Thus, even regarding an object with low image edge strength, such as the continuous structure 100 in the photographed image P1, the target Tg can be extracted.

Figure 4:
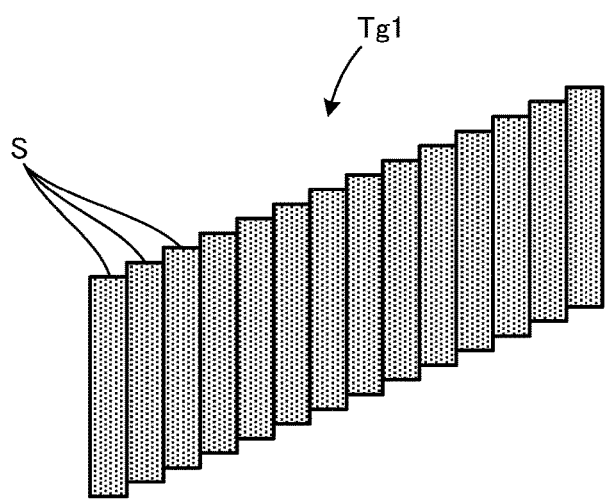
FIG. 4 is a conceptual diagram illustrating a target corresponding to the continuous structure.

FIG. 4 is a conceptual diagram illustrating a target Tg1 corresponding to the continuous structure 100. The target Tg1 corresponding to the continuous structure 100 is extracted as a plurality of segments S coupled in the image lateral direction and the depth direction. The continuous structure 100 has a shape close to a rectangular. Thus, the target Tg1 corresponding to the continuous structure 100 is extracted as the segments S coupled regularly.

Figure 5:
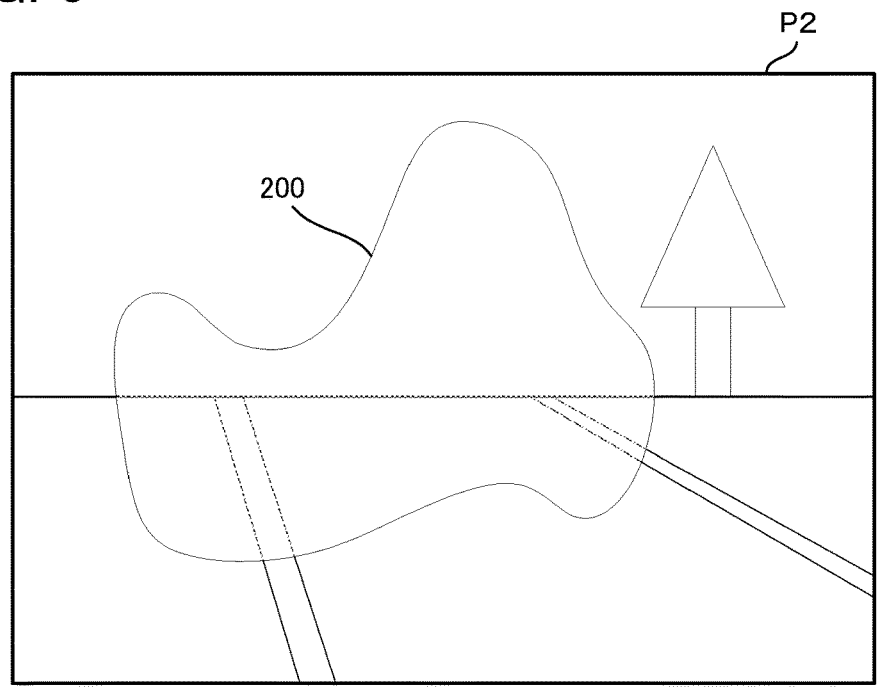
FIG. 5 is a diagram illustrating one example of a photographed image including a haze.

FIG. 5 is a diagram illustrating one example of a photographed image including a haze. A photographed image P2 includes a haze 200. The haze 200 has low image edge strength, as in the continuous structure 100 in FIG. 3, in its nature. By using the SGM, however, the target Tg can be extracted even regarding the haze 200.

Figure 6:
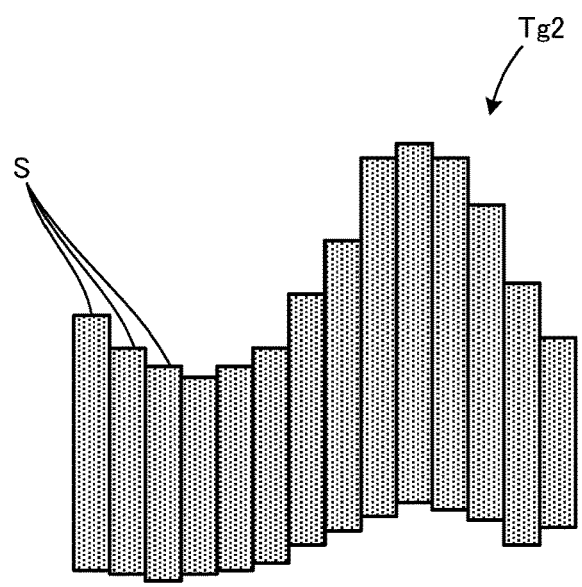
FIG. 6 is a conceptual diagram illustrating a target corresponding to the haze.

FIG. 6 is a conceptual diagram illustrating a target Tg2 corresponding to the haze 200. The target Tg2 corresponding to the haze 200 is extracted as a plurality of segments S coupled in the image lateral direction and the depth direction. The haze 200 does not have a clear shape like the continuous structure 100. Thus, in comparison with the target Tg1 corresponding to the continuous structure 100 illustrated in FIG. 4, the target Tg2 corresponding to the haze 200 has a distorted shape.

Figure 7:
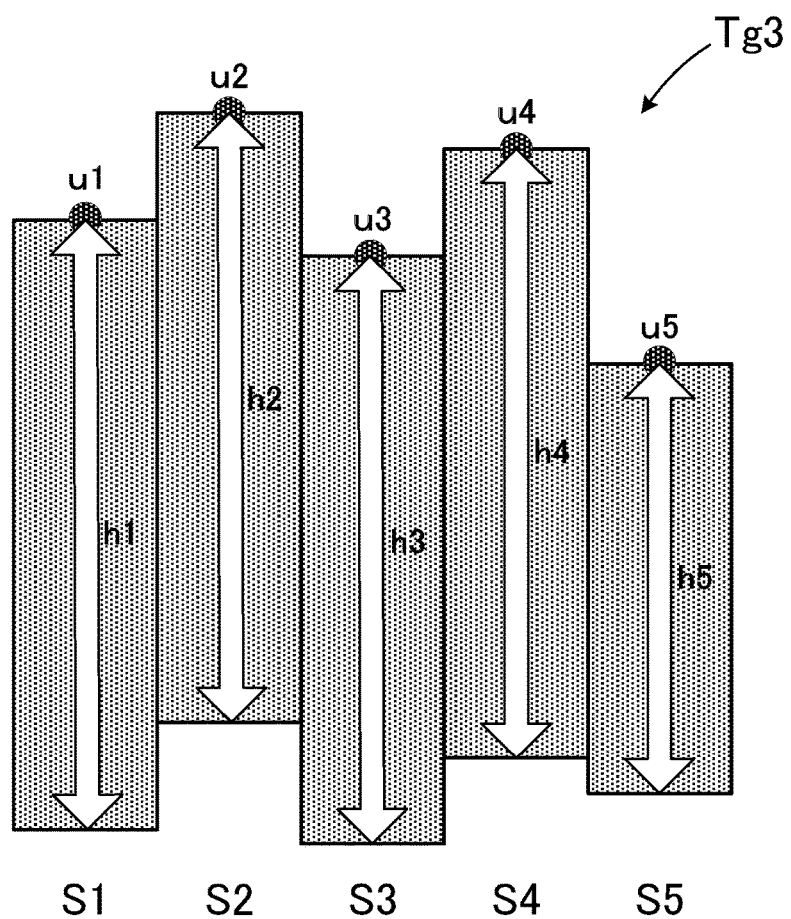
FIG. 7 is a conceptual diagram illustrating a method of calculating a segment information statistic value.

Back in FIG. 2, if the target Tg is extracted, a segment information statistic value is further calculated on the target extractor 23 (step S105). The "segment information statistic value" is a statistic value calculated regarding the plurality of segments S that constitutes the target Tg, and at least includes the number of the segments S that constitutes the target Tg, and respective upper end positions and height widths of the segments S. The "height width" means a length from the upper end position to a lower end position of the segment S. Hereinafter, with reference to FIG. 7, the segment information statistic value will be specifically explained. FIG. 7 is a conceptual diagram illustrating a method of calculating the segment information statistic value.

As illustrated in FIG. 7, it is assumed that a target Tg3 including five segments S1 to S5 is extracted. As the segment information statistic value, the number of the segments, which will be referred to as the segment number n (which is "5" herein), upper end positions u1 to u5 of the segments S1 to S5, and height widths h1 to h5 of the segments S1 to S5 are calculated. Each value of the segment number n, the upper end positions u1 to u5 of the segments S and the height widths h1 to h5 of the segments S calculated is outputted to the variation calculator 24.

Back in FIG. 2, on the variation calculator 24, it is firstly determined whether or not the segment number n is greater than or equal to a predetermined threshold value A (step S106). If the segment number n is not greater than or equal to the predetermined threshold value A (the step S106: NO), the subsequent process is omitted, and a series of process operations associated with the haze determination is ended.

The threshold value A is a threshold value for determining whether or not the number of the segments S is large enough for a variation amount of the upper end positions and a variation amount of the height widths of the segments S described later to statistically make sense. For example, if the segment number n is small, such as "1" and "2", the variation amount of the upper end positions and the variation amount of the height widths of the segments S do not statistically make sense. Thus, this may have an adverse effect on the result of the haze determination using the variation amounts. The threshold value A is set in advance to remove the aforementioned case in which the segment number n is extremely small. The threshold value A is one specific example of the "predetermined number".

If the segment number n is greater than or equal to the threshold value A (the step S106: YES), an upper end position variation amount σu, which is the variation amount of the upper end positions u of the segments S that constitute the target Tg, is calculated on the variation calculator 24, and it is determined whether or not the upper end position variation amount σu is greater than a predetermined threshold value B (step S107). Regarding the calculation of the upper end position variation amount σu, a detailed explanation will be omitted here because an existing method can be applied. If it is determined that the upper end position variation amount σu of the segments S is greater than the threshold value B (the step S107: YES), the target Tg is determined to be the haze 200 (step S109).

The threshold value B is a threshold value for determining whether or not the upper end positions u of the segments S that constitutes the target Tg vary greatly enough to determine that the target Tg is the haze 200. As is clear from FIG. 4 and FIG. 6, the target Tg1 corresponding to the continuous structure 100 illustrated in FIG. 4 has the upper end positions u of the segments S that are linearly aligned, and the target Tg2 corresponding to the haze 200 illustrated in FIG. 6 has the upper end positions u of the segments S that vary greatly. The upper end positions u of the segments S tend to show a clearly different tendency depending on whether the target Tg corresponds to the continuous structure 100 or the haze 200. It is therefore possible to determine whether or not the target Tg is the haze 200 by comparing the upper end position variation amount σu of the segments S with the threshold value B. The threshold value B is one specific example of the "predetermined threshold value".

Figure 8:
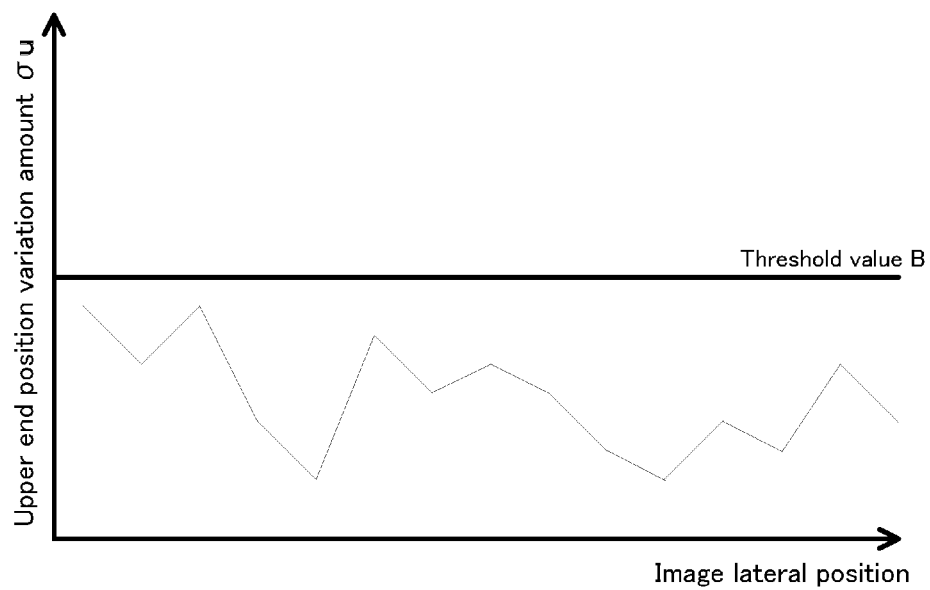
FIG. 8 is a graph illustrating one example of an upper end position variation amount of the target corresponding to the continuous structure.
Figure 9:
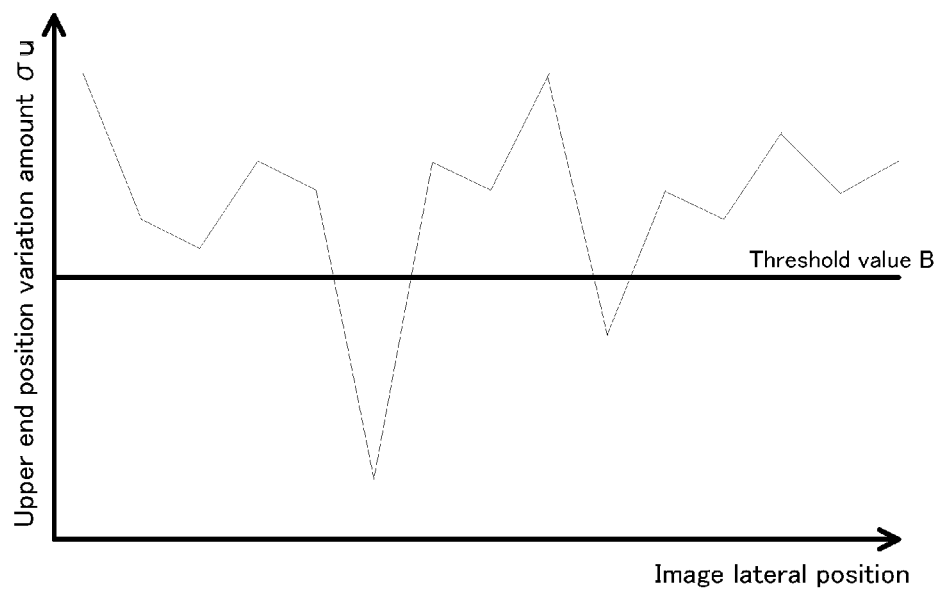
FIG. 9 is a graph illustrating one example of an upper end position variation amount of the target corresponding to the haze.

Hereinafter, the determination method using the upper end position variation amount σu will be specifically explained with reference to FIG. 8 and FIG. 9. FIG. 8 is a graph illustrating one example of the upper end position variation amount σu of the target Tg1 corresponding to the continuous structure 100. FIG. 9 is a graph illustrating one example of the upper end position variation amount σu of the target corresponding to the haze 200. The values of the upper end position variation amount σu illustrated in FIG. 8 and FIG. 9 are merely one example for representing a difference in tendency between the continuous structure 100 and the haze 200, and do not strictly correspond to the target Tg1 and the target Tg2 illustrated in FIG. 4 and FIG. 6.

As illustrated in FIG. 8, the upper end position variation amount σu of the target Tg1 corresponding to the continuous structure 100 is stable at a relatively low value even though it varies in some degree depending on the image lateral position. In particular, the upper end position variation amount σu of the target Tg1 does not exceed the threshold value B. In this case, the target Tg1 is not determined to be the haze 200.

As illustrated in FIG. 9, the upper end position variation amount σu of the target Tg2 corresponding to the haze 200 varies relatively greatly depending on the image lateral position. In particular, the upper end position variation amount σu of the target Tg2 exceeds the threshold value B in most of the positions. In this case, the target Tg2 is determined to be the haze 200.

Upon determination of the haze 200, the number of times in which the upper end position variation amount σu exceeds the threshold value B may be taken into account. Specifically, the target may be determined to be the haze 200 if the upper end position variation amount σu exceeds the threshold value B only once, or if the upper end position variation amount σu exceeds the threshold value B a predetermined times which is twice or more. Alternatively, the target may be determined to be the haze 200 if the proportion of the number of times in which the upper end position variation amount σu exceeds the threshold value B to the whole is greater than or equal to a predetermined proportion.

Back in FIG. 2, if it is determined that the upper end position variation amount σu of the segments S is less than or equal to the threshold value B (the step S107: NO), a height width variation amount σh, which is the variation amount of the height widths h of the segments S that constitute the target Tg, is calculated on the variation calculator 24, and it is determined whether or not the height width variation amount σh is greater than a predetermined threshold value C (step S108). Regarding the calculation of the height width variation amount σh, a detailed explanation will be omitted here because an existing method can be applied. If it is determined that the height width variation amount σh of the segments S is greater than the threshold value C (the step S108: YES), the target Tg is determined to be the haze 200 (the step S109). In other words, even if the target is not determined to be the haze 200 from the relation between the upper end position variation amount σu and the threshold value B, the target may be determined to be the haze 200 depending on the relation between the height width variation amount σh of the segments S and the threshold value C.

The threshold value C is a threshold value for determining whether or not the height widths h of the segments S that constitutes the target Tg vary greatly enough to determine that the target Tg is the haze 200. As is clear from FIG. 4 and FIG. 6, the target Tg1 corresponding to the continuous structure 100 illustrated in FIG. 4 has the height widths h of the segments S that are substantially constant, and the target Tg2 corresponding to the haze 200 illustrated in FIG. 6 has the height widths h of the segments S that vary greatly. The height widths h of the segments S tend to show a clearly different tendency depending on whether the target Tg corresponds to the continuous structure 100 or the haze 200. It is therefore possible to determine whether or not the target Tg is the haze 200 by comparing the height width variation amount σh of the segments S with the threshold value C. The threshold value C is one specific example of the "predetermined threshold value", as in the threshold value B described above. The threshold value B and the threshold value C are, however, not necessarily the same value, and may be set to be different from each other (i.e. may be set separately as values respectively corresponding to the upper end position variation amount σu and the height width variation amount σh).

Figure 10:
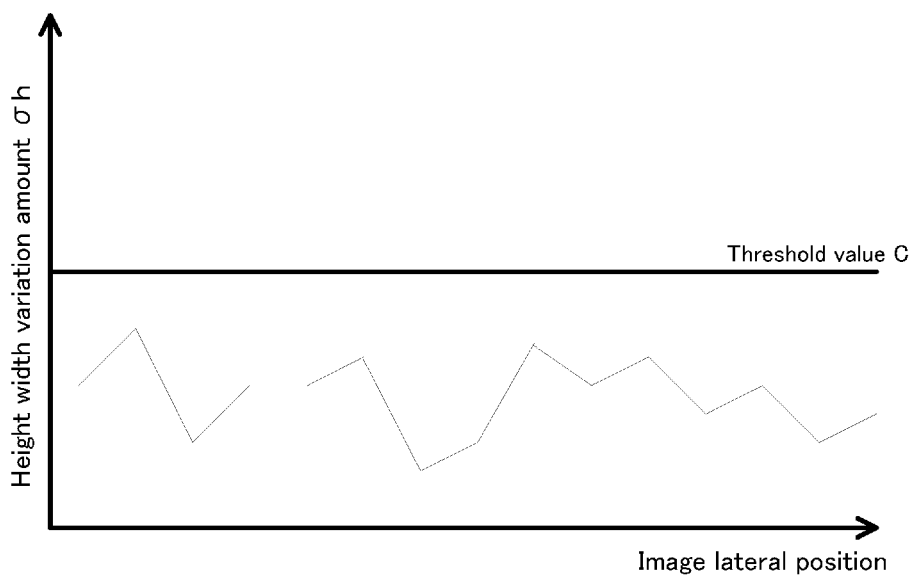
FIG. 10 is a graph illustrating one example of a height width variation amount of the target corresponding to the continuous structure.
Figure 11:
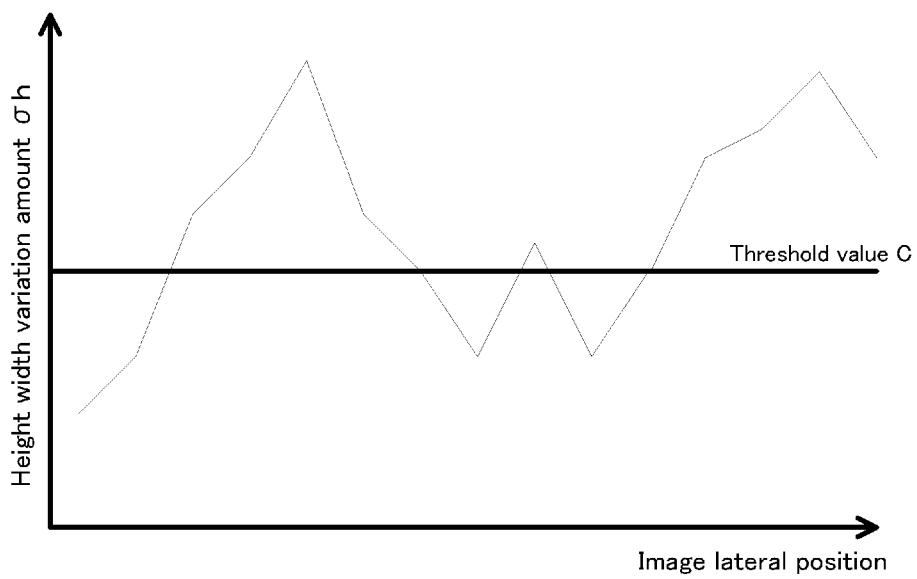
FIG. 11 is a graph illustrating one example of a height width variation amount of the target corresponding to the haze.

Hereinafter, the determination method using the height width variation amount σh will be specifically explained with reference to FIG. 10 and FIG. 11. FIG. 10 is a graph illustrating one example of the height width variation amount σh of the target Tg1 corresponding to the continuous structure 100. FIG. 11 is a graph illustrating one example of the height width variation amount σh of the target corresponding to the haze 200. The values of the height width variation amount σh illustrated in FIG. 10 and FIG. 11 are merely one example for representing a difference in tendency between the continuous structure 100 and the haze 200, and do not strictly correspond to the target Tg1 and the target Tg2 illustrated in FIG. 4 and FIG. 6.

As illustrated in FIG. 10, the height width variation amount σh of the target Tg1 corresponding to the continuous structure 100 is stable at a relatively low value even though it varies in some degree depending on the image lateral position. In particular, the height width variation amount σh of the target Tg1 does not exceed the threshold value C. In this case, the target Tg1 is not determined to be the haze 200.

As illustrated in FIG. 11, the height width variation amount σh of the target Tg2 corresponding to the haze 200 varies relatively greatly depending on the image lateral position. In particular, the height width variation amount σh of the target Tg2 exceeds the threshold value C in most of the positions. In this case, the target Tg2 is determined to be the haze 200.

Upon determination of the haze 200, as in the case of the upper end position variation amount σu described above, the number of times in which the height width variation amount σh exceeds the threshold value C may be taken into account. Specifically, the target may be determined to be the haze 200 if the height width variation amount σh exceeds the threshold value C only once, or if the height width variation amount σh exceeds the threshold value C a predetermined times which is twice or more. Alternatively, the target may be determined to be the haze 200 if the proportion of the number of times in which the height width variation amount σh exceeds the threshold value C to the whole is greater than or equal to a predetermined proportion.

Back in FIG. 2, if it is determined that the height width variation amount σh of the segments S is less than or equal to the threshold value C (the step S108: NO), the target Tg is determined to be the continuous structure 100 (step S110). As described above, in the haze determination process according to the embodiment, the target Tg is determined to be the haze 200 if at least one of the upper end position variation amount σu and the height width variation amount σh of the segments S is greater than a predetermined threshold value (i.e. the threshold value B or the threshold value C), and the target Tg is determined to be the continuous structure 100 in the other cases.

In the aforementioned embodiment, the determination regarding the upper end position variation amount σu of the segments S is performed before the determination regarding the height width variation amount σh of the segments S; however, any one of these determination processes (i.e. the step S108 and the step S108 in FIG. 2) may be performed first. The determination result does not change even if the determination regarding the upper end position variation amount σu of the segments S is performed after the determination regarding the height width variation amount σh of the segments S.

(Effect of the Invention)

According to the object recognizing apparatus 1 in the embodiment, the aforementioned haze determination process allows the determination of whether the extracted target Tg is the haze 200 or the continuous structure 100.

In particular, the haze 200 and the continuous structure 100 have the common characteristic feature that the image edge strength is low when image processing is performed. Thus, it is hard to accurately distinguish the haze 200 and the continuous structure 100 only from the image edge strength.

In the embodiment, however, it is determined whether or not the target Tg is the haze 200 on the basis of the upper end position variation amount σu and the height width variation amount σh of the segments S, as described above. It is therefore possible to accurately determine whether or not the target Tg is the haze 200. In other words, it is possible to prevent that the target Tg corresponding to the haze 200 is determined to be the continuous structure 100, or that the target Tg corresponding to the continuous structure 100 is determined to be the haze 200.

By using the determination result of the object recognizing apparatus 1, for example, the pre-crash safety system of the vehicle can be operated. Specifically, if the recognized target Tg is determined to be the continuous structure 100, a brake is automatically operated when there is a risk of a collision with the continuous structure 100. In this case, the collision of the vehicle with the continuous structure 100 is certainly avoided. On the other hand, if the recognized target Tg is determined to be the haze 200, the brake is not operated in the aforementioned timing. In this manner, it is possible to prevent that the vehicle is unnecessarily decelerated due to the automatic brake applied to the haze with which there is no need to avoid the collision.

<Second Embodiment>

Next, an object recognizing apparatus and a haze determination method according to a second embodiment of the present invention will be explained. In the second embodiment, the operation is partially different from that in the first embodiment described above, and the other configuration is substantially the same. Therefore, hereinafter, a different part from the first embodiment will be explained in detail, and an explanation of the same part will be omitted.

(Haze Determination Method)

The haze determination method according to the second embodiment will be explained with reference to a flowchart in FIG. 12. FIG. 12 is a flowchart illustrating a flow of the haze determination process according to the second embodiment. A routine of the haze determination process illustrated in FIG. 12 is repeatedly performed every predetermined period while the ignition switch of the vehicle is on.

In FIG. 12, in the haze determination process performed by the object recognizing apparatus 1 according to the second embodiment, firstly, a pair of image data photographed by the stereo camera 10 is acquired (step S201). The image acquirer 21 outputs the acquired pair of image data to the segment extractor 22.

On the segment extractor 22, parallax is calculated from the pair of image data (step S202). If the parallax is calculated, a segment S is further extracted on the segment extractor 22 (step S203). A segment extraction result by the segment extractor 22 is outputted to the target extractor 23.

On the target extractor 23, the segments S coupled in the image lateral direction and the depth direction are extracted as a target Tg corresponding to an object in the photographed images (step S204). If the target Tg is extracted, a segment information statistic value is further calculated on the target extractor 23 (step S205). As in the first embodiment, the segment information statistic value here also at least includes the number of segments that constitutes the target Tg, which will be referred to as the segment number n, upper end positions u of the segments S, and height widths h of the segments S. The segment number n, and the upper end positions u and the height widths h of the segments S calculated are outputted to the variation calculator 24.

On the variation calculator 24, it is firstly determined whether or not the segment number n is greater than or equal to a predetermined threshold value A (step S206). If the segment number n is not greater than or equal to the predetermined threshold value A (the step S206: NO), the subsequent process is omitted, and a series of process operations associated with the haze determination is ended.

If the segment number n is greater than or equal to the threshold value A (the step S206: YES), an upper end position variation amount σu of the segments S that constitute the target Tg is calculated on the variation calculator 24, and it is determined whether or not the upper end position variation amount σu is greater than a predetermined threshold value B (step S207). The threshold value B according to the second embodiment is one specific example of the "first threshold value".

Particularly in the second embodiment, if it is determined that the upper end position variation amount σu of the segments S is less than or equal to the threshold value B (the step S207: NO), the target Tg is determined to be the continuous structure 100 (step S210). In other words, in the second embodiment, it may be determined that the target Tg is not the haze 200, only from the relation between the upper end position variation amount σu of the segments S and the threshold value B.

If it is determined that the upper end position variation amount σu of the segments S is greater than the threshold value B (the step S207: YES), a height width variation amount σh of the segments S that constitute the target Tg is calculated on the variation calculator 24, and it is determined whether or not the height width variation amount σh is greater than a predetermined threshold value C (step S208). The threshold value C according to the second embodiment is one specific example of the "second threshold value".

If it is determined that the height width variation amount σh of the segments S is less than or equal to the threshold value C (the step S208: NO), the target Tg is determined to be the continuous structure 100 (the step S210). As is clear from the processes so far, in the haze determination process according to the second embodiment, the target Tg is determined to be the continuous structure 100 if it is determined that at least one of the upper end position variation amount σu and the height width variation amount σh of the segments S is not greater than a predetermined threshold value.

On the other hand, if it is determined that the height width variation amount σh of the segments S is greater than the threshold value C (the step S208: YES), the target Tg is determined to be the haze 200 (step S209). As described above, in the second embodiment, the target Tg is determined to be the haze 200 if both of the upper end position variation amount σu and the height width variation amount σh of the segments S are greater than their respective predetermined threshold values.

In the aforementioned embodiment, the determination regarding the upper end position variation amount σu of the segments S is performed before the determination regarding the height width variation amount σh of the segments S; however, any one of these determination processes (i.e. the step S207 and the step S208 in FIG. 12) may be performed first. The determination result does not change even if the determination regarding the upper end position variation amount σu of the segments S is performed after the determination regarding the height width variation amount σh of the segments S.

Unless otherwise explained, the operation processes from the step S201 to the step S210 in FIG. 12 are respectively the same as the operation processes from the step S101 to the step S110 in FIG. 2.

(Effect of the Invention)

In the object recognizing apparatus 1 according to the second embodiment, the target Tg is determined to be the haze 200 if both of the upper end position variation amount σu and the height width variation amount σh of the segments S are greater than their respective predetermined threshold values, as described above. Thus, if only one of the upper end position variation amount σu and the height width variation amount σh of the segments S is greater than the predetermined threshold value, the target Tg is not determined to be the haze 200. The target Tg is hardly determined to be the haze in comparison with the first embodiment.

If the determination result of the object recognizing apparatus 1 is used for the pre-crash safety system of the vehicle, even if the target Tg that should be determined to be the haze 200 is erroneously determined to be the continuous structure 100, the brake of the vehicle is simply operated in inappropriate timing. However, if the target Tg that should be determined to be the continuous structure 100 is erroneously determined to be the haze 200, the brake is not automatically operated, which likely causes the collision of the vehicle with the continuous structure 100. In this manner, it is preferable to avoid, with priority, that the continuous structure 100 is erroneously determined to be the haze 200.

In contrast, in the second embodiment, in order to determine that the target Tg is the haze, it is required that both of the upper end position variation amount σu of the segments S and the height width variation amount σh of the segments S are greater than their respective predetermined threshold values. This makes it possible to more certainly prevent that the target Tg that should be determined to be the continuous structure 100 is erroneously determined to be the haze 200.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An object recognizing apparatus comprising:
 a processor programmed to:
   acquire a plurality of images photographed by a stereo camera;
   calculate parallax from the plurality of images and to extract a set in which the parallax is within a predetermined range, as a segment, at intervals of a certain width in an image lateral direction;
   extract segments coupled in the image lateral direction and an image depth direction, as a target;
   calculate a variation amount of upper end positions and a variation amount of height widths of the segments that constitute the target;
   determine that the target is a haze if at least one of the variation amount of the upper end positions and the variation amount of the height widths is greater than a predetermined threshold value; and
 when the target is determined to not be the haze, a brake is automatically operated, and when the target is determined to be the haze, the brake is not automatically operated.

2. The object recognizing apparatus according to claim 1, wherein said processer is further configured to determine that the target is the haze if the variation amount of the upper end positions is greater than a first threshold value, which is the predetermined threshold value, and if the variation amount of the height widths is greater than a second threshold value, which is the predetermined threshold value.

3. The object recognizing apparatus according to claim 1, wherein the processor is further configured to calculate the variation amount of the upper end positions and the variation amount of the height widths if the number of the segments that constitutes the target is greater than or equal to a predetermined number.

4. A haze determination method comprising:

acquiring a plurality of images photographed by a stereo camera;

calculating parallax from the plurality of images and extracting a set in which the parallax is within a predetermined range, as a segment, at intervals of a certain width in an image lateral direction;

extracting segments coupled in the image lateral direction and an image depth direction, as a target;

calculating a variation amount of upper end positions and a variation amount of height widths of the segments that constitute the target;

determining that the target is a haze if at least one of the variation amount of the upper end positions and the variation amount of the height widths is greater than a predetermined threshold value; and automatically operating a brake when the target is determined to not be the haze, and not automatically operating the brake when the target is determined to be the haze.

* * * * *